United States Patent [19]

Gatarz et al.

[11] Patent Number: 5,206,076

[45] Date of Patent: Apr. 27, 1993

[54] ELASTOMERIC MOLD SEALS

[75] Inventors: Gregory M. Gatarz, East Brunswick, N.J.; Ronald M. Marsilio, Mogadore, Ohio

[73] Assignee: American Standard Inc., New York, N.Y.

[21] Appl. No.: 931,436

[22] Filed: Aug. 19, 1992

Related U.S. Application Data

[63] Continuation of Ser. No. 467,771, Jan. 19, 1990, abandoned.

[51] Int. Cl.⁵ .............................................. B32B 7/02
[52] U.S. Cl. ...................................... 428/217; 428/31; 428/122; 428/192; 428/422.8; 428/423.1; 4/584; 4/595
[58] Field of Search ............... 428/31, 122, 192, 217, 428/422.8, 423.1; 52/716; 4/584, 595

[56] References Cited

U.S. PATENT DOCUMENTS

| | | | |
|---|---|---|---|
| 400,289 | 8/1989 | Kuszaj et al. | |
| 458,598 | 12/1989 | Marsilio et al. | |
| 2,841,823 | 7/1958 | Van Hartesveldt | 249/65 |
| 4,120,632 | 10/1978 | Stoeberl | 425/405 |
| 4,664,982 | 5/1987 | Genovese et al. | 428/447 |
| 4,688,752 | 8/1987 | Barteck et al. | 249/85 |
| 4,732,553 | 3/1988 | Hofer | 425/116 |
| 4,844,944 | 7/1989 | Graefe et al. | 428/357 |
| 4,844,955 | 7/1989 | Graefe et al. | 428/420 |
| 4,854,599 | 8/1989 | Barteck | 277/227 |
| 4,857,389 | 8/1989 | Wheeler | 428/217 |

FOREIGN PATENT DOCUMENTS 0230709 8/1987 European Pat. Off. .
89/01398 2/1989 PCT Int'l Appl. .

Primary Examiner—Patrick J. Ryan
Assistant Examiner—Elizabeth Evans
Attorney, Agent, or Firm—Blum Kaplan

[57] ABSTRACT

An elastomeric seal used in molding articles is disclosed. The seal has a first lateral cross-sectional dimension larger than the opening of a seal groove and at least a second lateral cross-sectional extending beyond the opening of a seal groove which is smaller than the lateral cross-sectional dimension at the opening of the seal groove. The elastomeric seal is releasably retained in the seal groove and provides an improved molding cavity for molding articles such as sanitary fixtures, i.e., tubs, whirlpools, spas, etc. Also disclosed, is a molding apparatus including the elastomeric seals useful in molding sanitary fixtures.

23 Claims, 14 Drawing Sheets

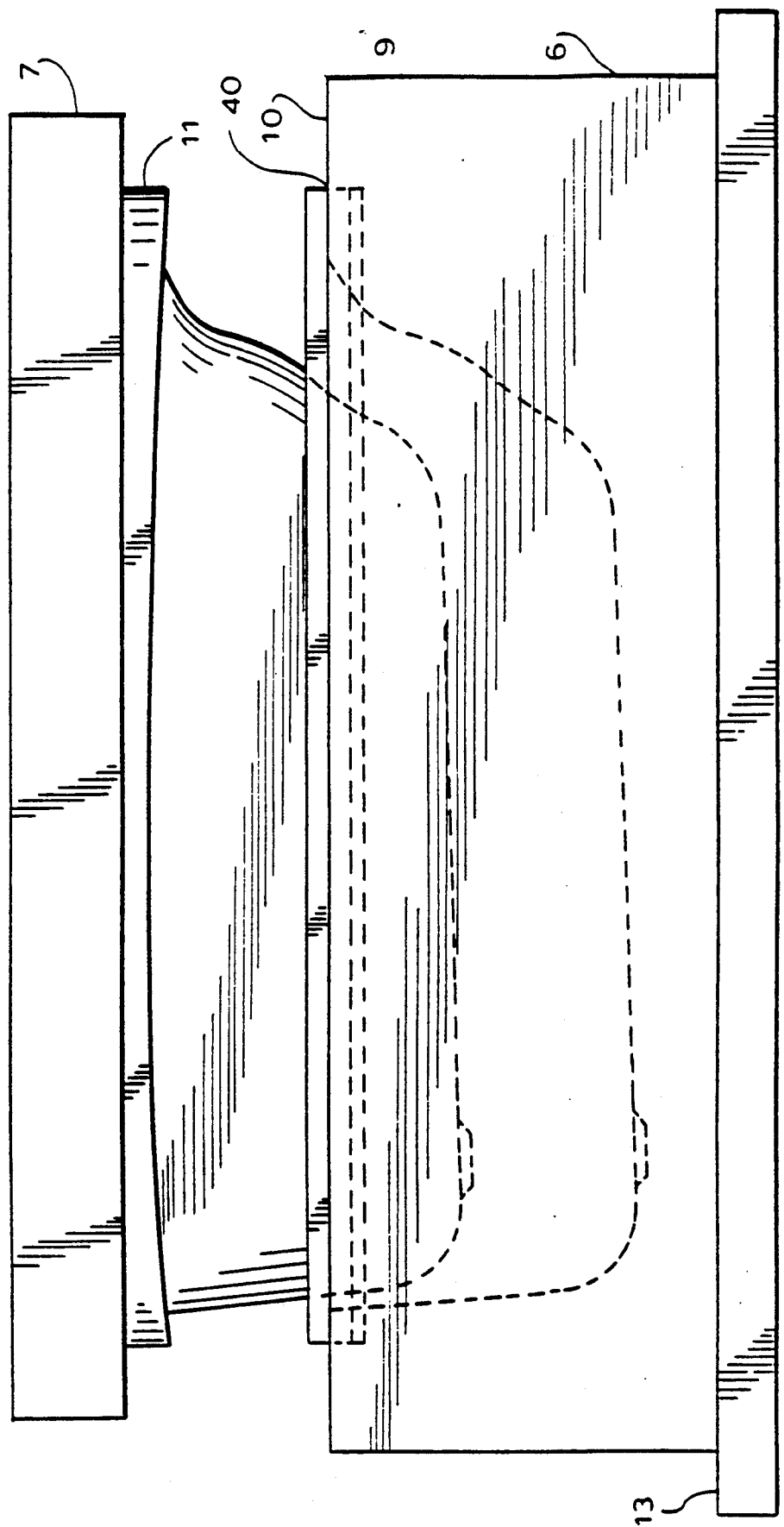

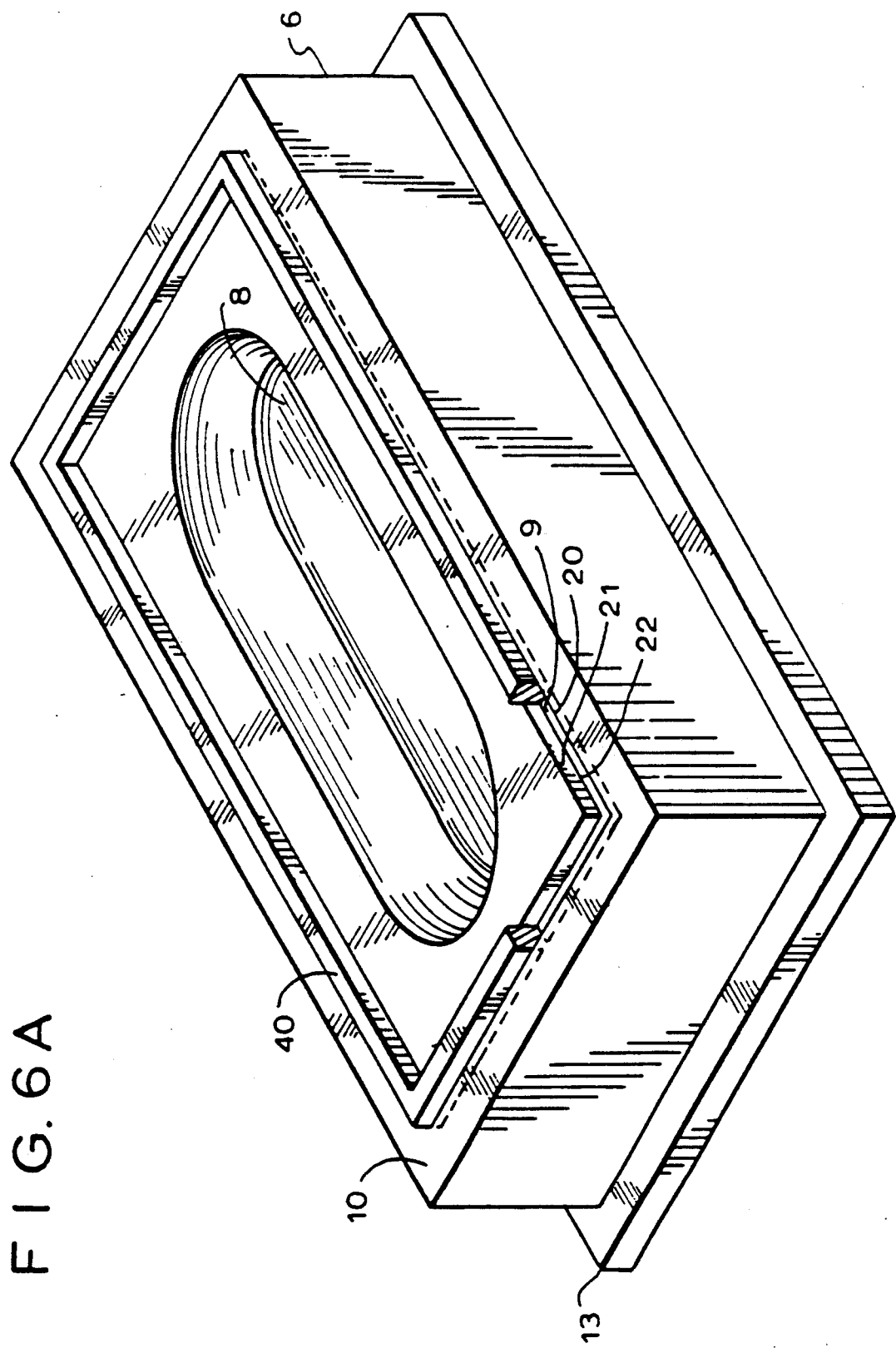

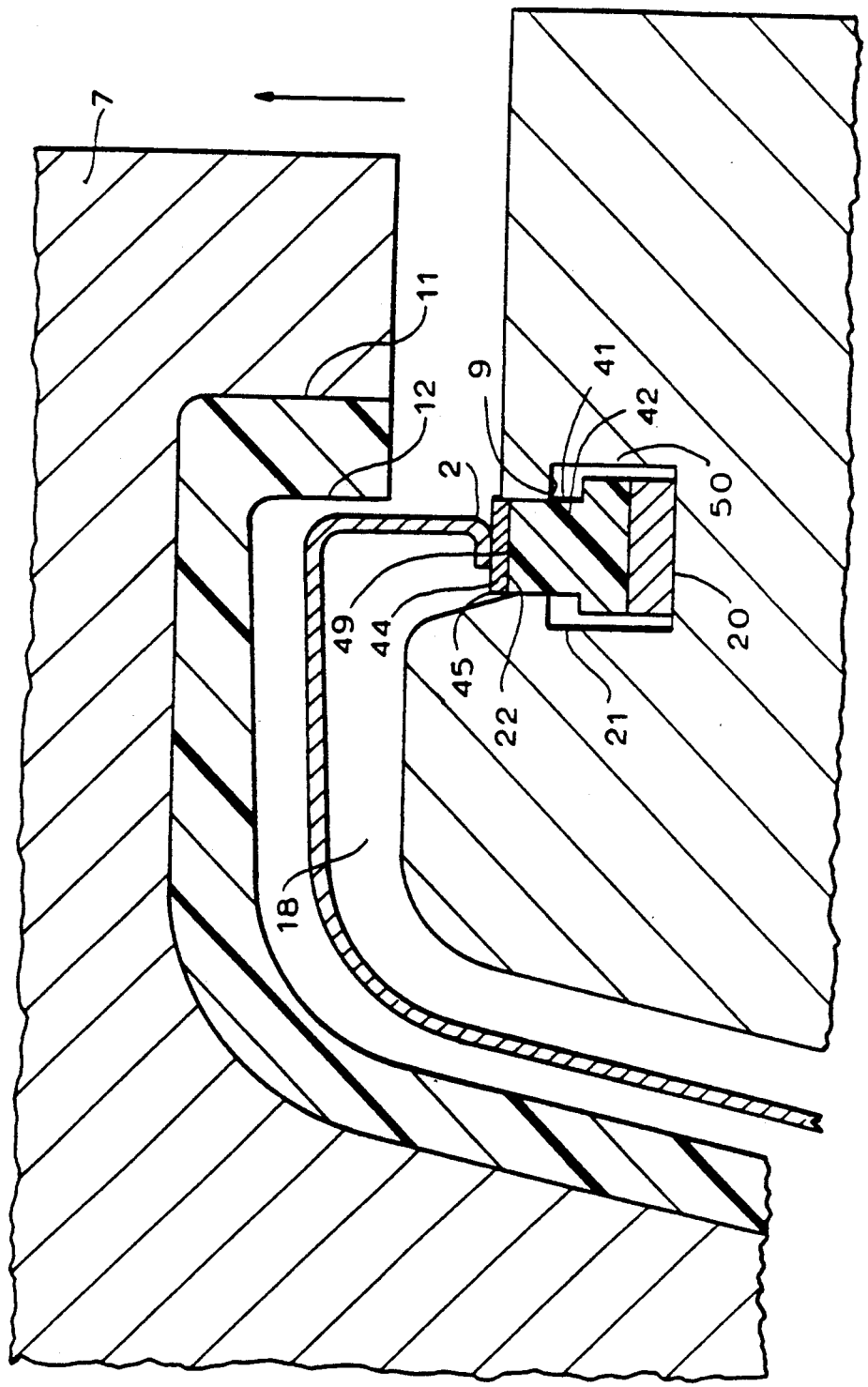

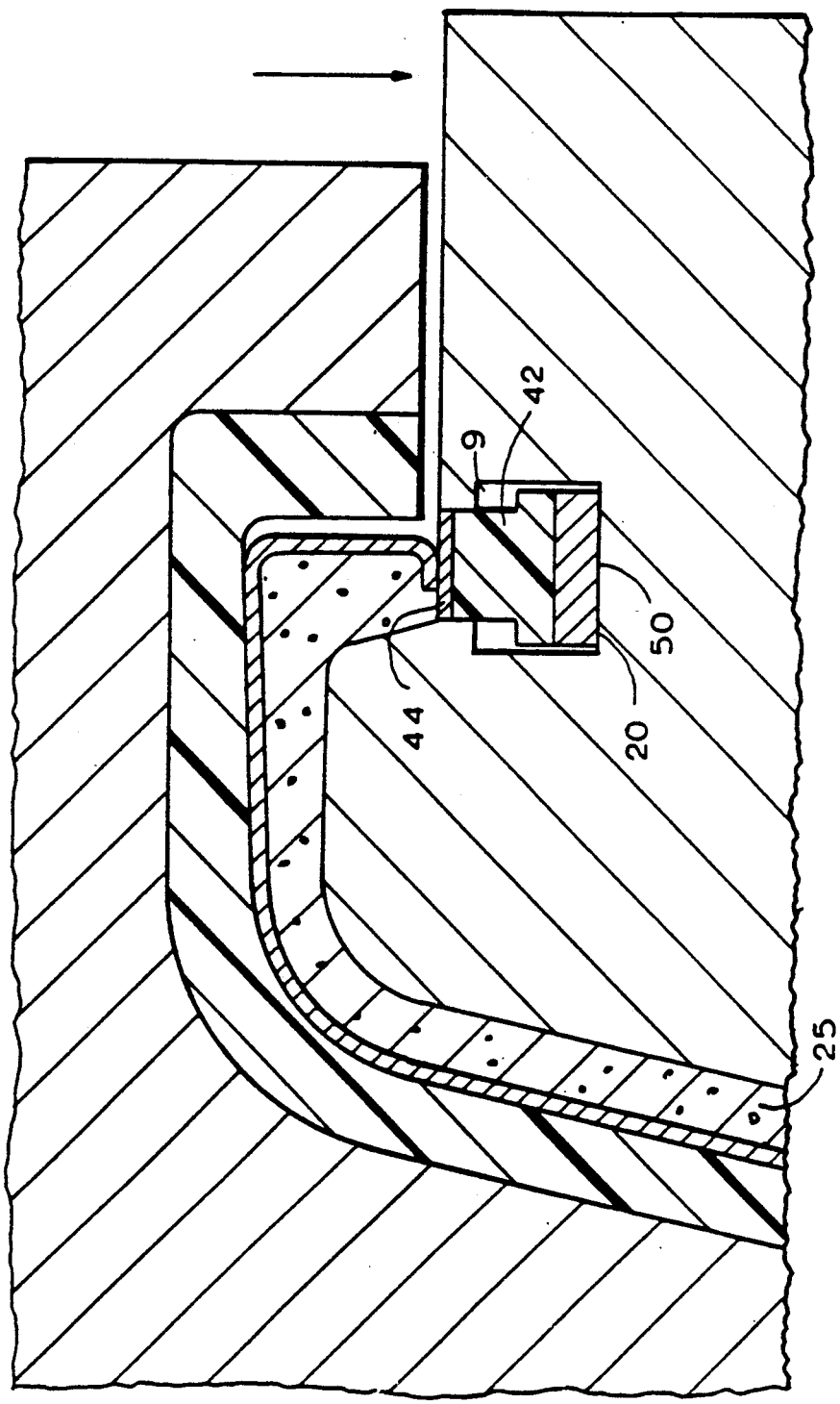

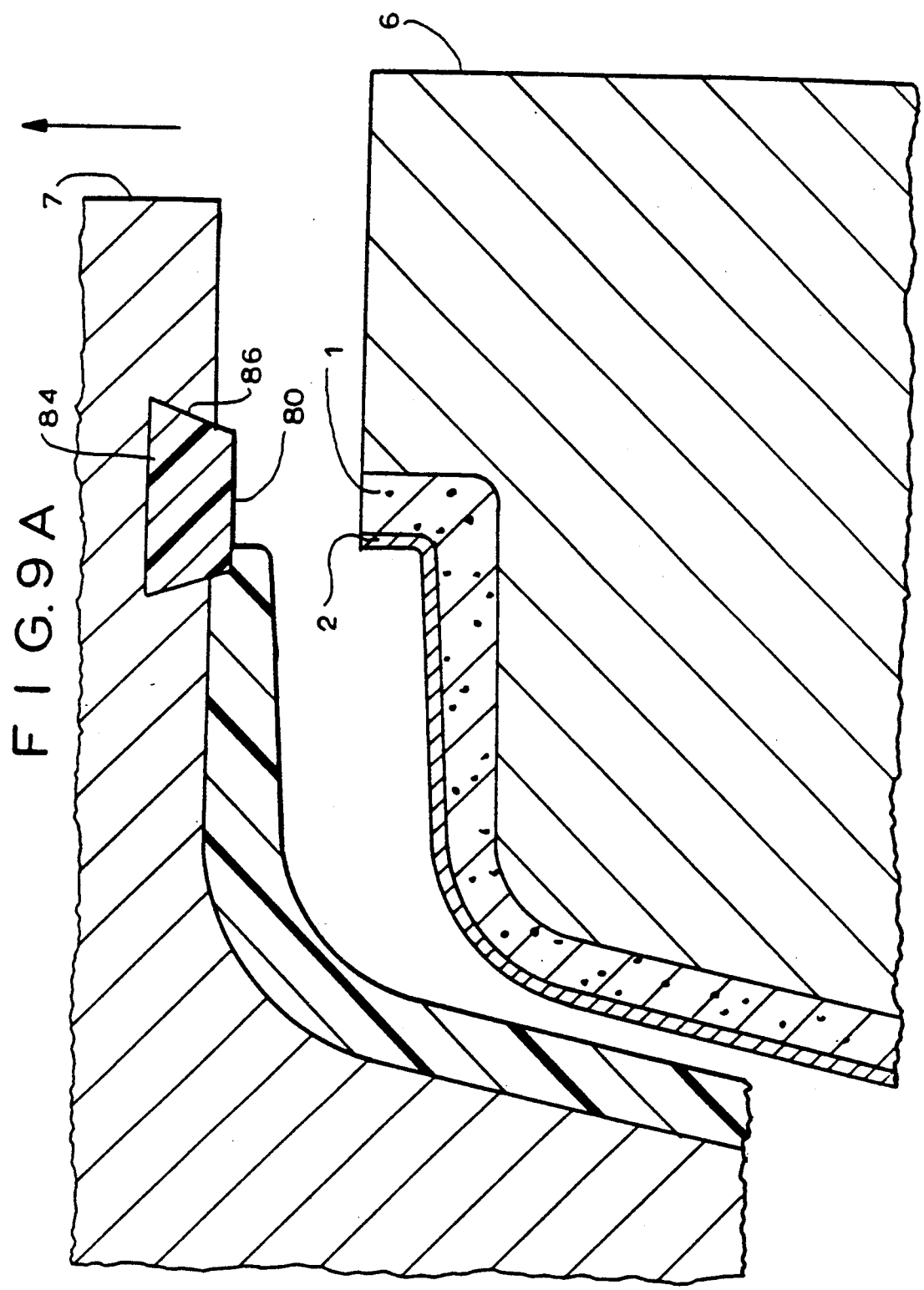

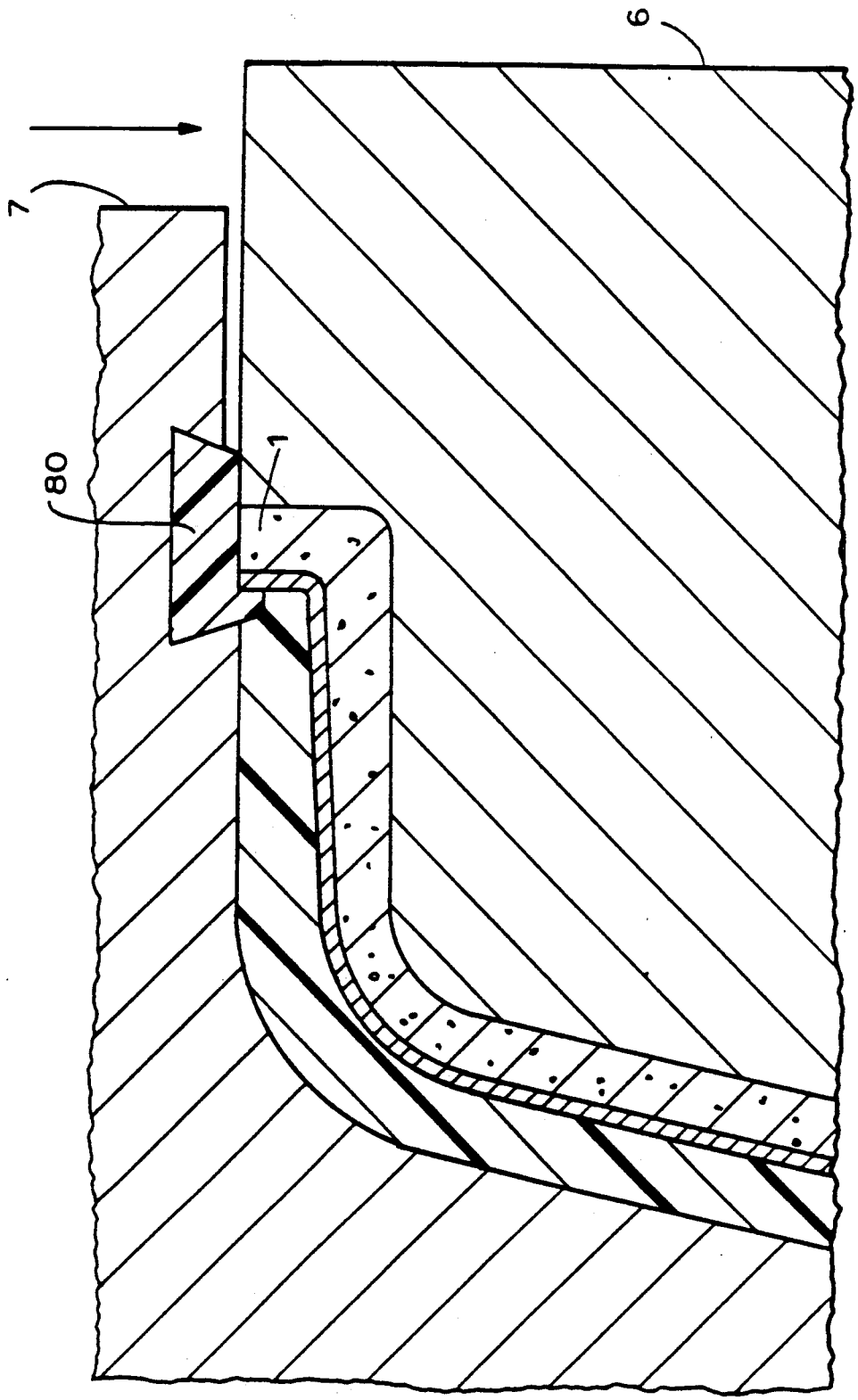

F I G. 10
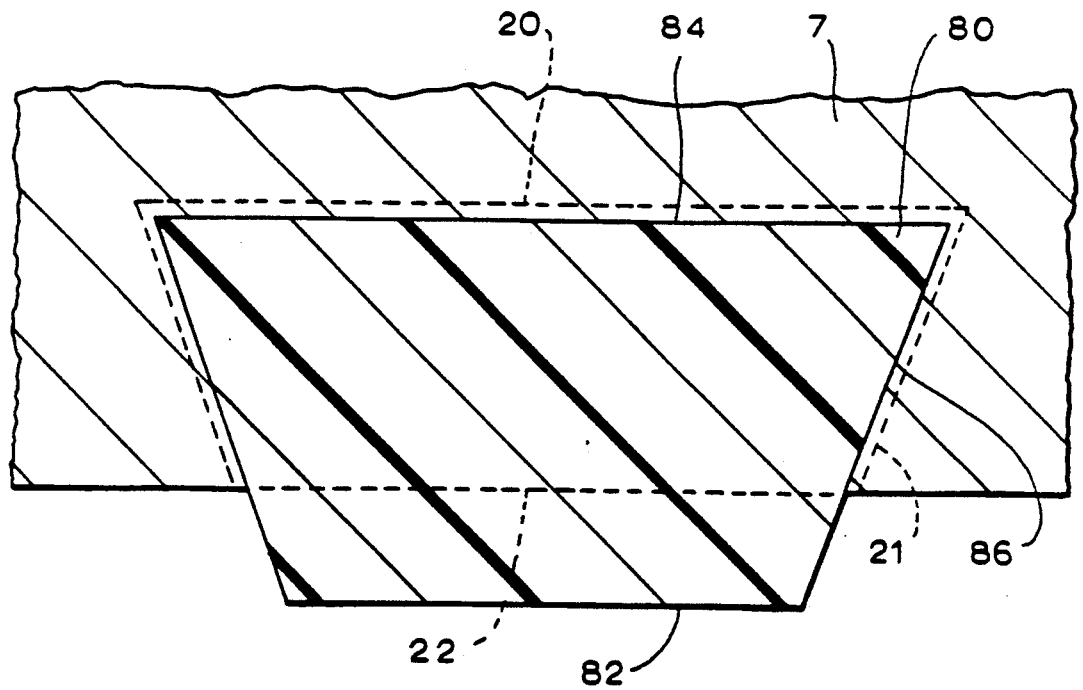
F I G. 11
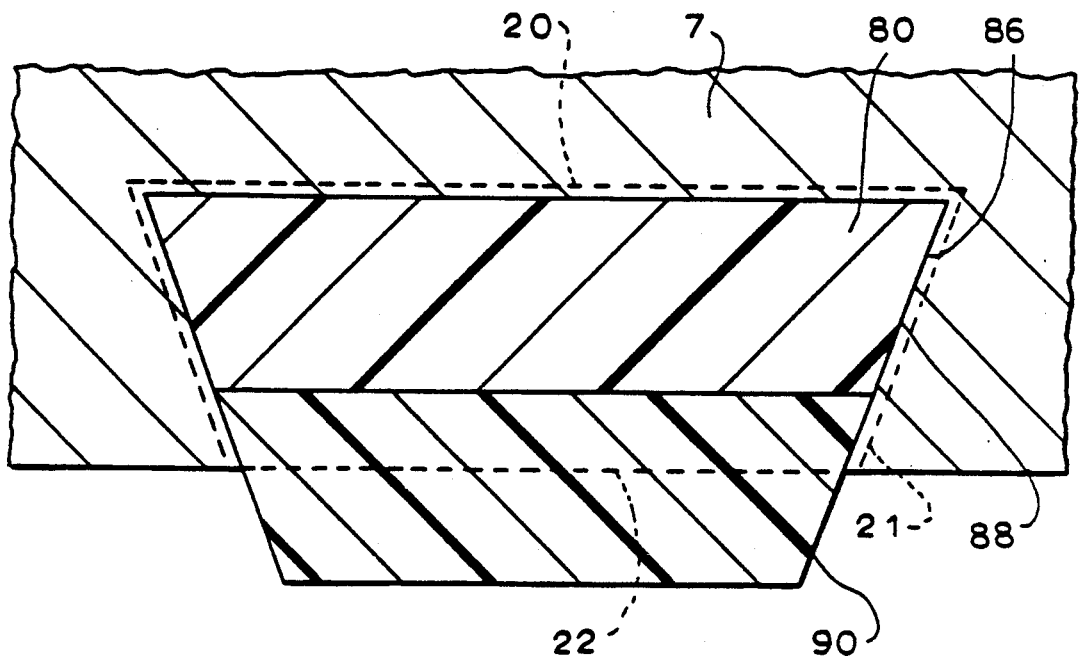

ELASTOMERIC MOLD SEALS

This is a continuation of U.S. patent application Ser. No. 07/467,771, filed on Jan. 19, 1990, is now abandoned for ELASTOMERIC MOLD SEALS.

BACKGROUND OF THE INVENTION

1. Field of the Invention

The present invention relates to elastomeric seals used in molding apparatus.

2. Background of Related Art

For years, porcelain-cast iron fixtures have been widely used. However, the drawbacks of the porcelain-cast iron and enamelled fixtures have always been their susceptibility to impact damage and their extreme weight which makes moving and installation of large fixtures such as bathtubs and whirlpools, most difficult. While the porcelain-cast iron fixtures have the advantage of providing a very solid feel and a high weight bearing capability, these drawbacks have made these tubs less attractive to the purchasing public.

Initial attempts by the industry to replace these porcelain-cast iron fixtures, have been to introduce lighter and more resilient component structures, however, this has not been without difficulty. Some of these attempts included thin stainless steel fixtures which were lighter than porcelain-cast iron fixtures, but did not have the solid feel or structural strength required for large articles such as bathtubs and whirlpool tubs. Other attempts included composite structures which had a plastic, hollow feel, and would deform, crack, chip or delaminate when subjected to impact, thermal shock or the weight of a typical bather. One successful solution to the above-mentioned shortcomings and drawbacks of the prior art sanitary fixtures, is disclosed in U.S. Pat. No. 4,664,982 to Genovese, et al., the disclosure of which is incorporated by reference herein. U.S. Pat. No. 4,664,982 to Genovese, et al. discloses a composite enamel steel structure which has the look and feel of the earlier porcelain-cast iron fixtures. The composite structure is light, has high structural strength, and resist delamination, chipping and denting due to impact or thermal shock. The composite enamel steel fixture is formed from a steel shell, which is typically formed from a steel blank by a series of stamping and punching operations. The shell is then enamelled on both its finish and non-finish sides. The enamelling process usually includes heating the steel shell to high temperatures melting the enamel onto the shell surface. This heating and subsequent cooling often results in slight bowing and distortion of the shell. The shell thusly formed is used as a part of a mold to form a layer of reinforced foam plastic by Reaction Injection Molding ("RIM") or by Reinforced Reaction Injection Molding ("RRIM") processing on the non-finished (i.e., underside, of shell).

Commonly assigned U.S. Pat. No. 4,664,092 to Genovese, et al. and U.S. patent application Ser. No. 07/400,289, now abandoned, to Kuszaj, et al. both of which are incorporated by reference herein, describe polymeric foam backed enamelled-carbon steel or stainless steel plumbing fixtures that are resistant to chipping, cracking, crazing, delamination or deformation when subjected to impact from either the finish or non-finish side. The use of the aforementioned composite mold structures results in fixtures which have the feel of porcelain-cast iron and enamel fixtures, high impact strength, and resistance to delamination. These composite structures possess excellent physical and mechanical properties as a result of the chemical bonding of the reinforced polymeric layer to the enamelled steel or stainless steel shell.

Another approach was to replace the enamelled-steel shell with a polymeric-cosmetic surface layer and binding that layer directly to a foamed plastic substrate to provide a high impact strength, delamination-resistant structure. This approach is disclosed in commonly assigned U.S. Pat. Nos. 4,844,944 and 4,844,955 both to Graefe, et al., the disclosures of which are incorporated by reference herein. These approaches suffer from the same problems described above with regard to bowing, and warpage of the shell due to the irregularity in the shell from the manufacturing process. Co-pending U.S. patent application Ser. No. 07/458,598 to Marsilio et al. filed on Dec. 29, 1989, now U.S. Pat. No. 5,129,804, describes a molding apparatus which is suitable for molding a layer of reinforced polymeric material to the non-finish side of a shell. The molding apparatus described in this application can be used with any of the shells and polymeric materials which are described in U.S. Pat. Nos. 4,664,982, 4,844,944, 4,844,955 and 4,664,092 and U.S. application Nos. 07/400,289 and 07/458,598 as described above.

Typically, a shell having a finish and a non-finish side is inserted into a female mold receptor forming a cavity between the molding receptacle surface and a non-finish portion of the shell. In order to close the cavity and allow sufficient support to be applied during the molding operation, a male molding portion having a surface which substantially conforms to the finished surface contour of the shell, is urged against the finished side of the shell. A cavity is formed between the molding receptacle and the nonfinish side of the shell. The cavity must be sealed around the periphery of the shell to prevent leakage of the foamed polymeric material from the cavity. Accordingly, seals are required which can accommodate variations in the shape of the shells resulting from the manufacturing process used. In one proposed sealing system which may be used, a molding apparatus includes a urethane coating on an undersized male molding portion which matches the finish surface of the shell. This protective urethane coating is molded on the surface of the male molding portion in a space adjacent to the shells finished surface by injecting urethane in the space. The cured polyurethane about the male molding portion forms a surface on the male molding portion which contacts the periphery of the shell and a portion of a molding receptacle, so as to seal off a molding cavity between the non-finish surface of the shell and a surface of the molding receptacle.

This molded sealing system suffers from several significant shortcomings and drawbacks. In particular, the seal is cast as part of the protective urethane surface coating of the male mold portion. It is therefore difficult and expensive to replace. Since such seals typically wear and deteriorate over repeated molding cycles, such sealing systems are not desirable. Also, due to variations in the shape of the shell due to the manufacturing process the shape of the molded seals may vary. Accordingly, it is extremely difficult and often impossible to form an adequately sealed molding cavity with each new shell into which the foamed polymeric material can be introduced under adequate molding pressure. Consequently, the foamed polymeric material flows beyond the seal and often damaging the finished surface of the shell, or adhering to the mold receptor.

In another proposed sealing system used in molding bathtubs, U.S. Pat. No. 2,841,823 discloses a molding apparatus for low pressure compression molding of laminates useful in fabricating large bulky objects such as boats or bathtubs. The mold includes an L-shaped baffle anchored in an upper molding block, extending outwardly and downwardly from the molding block and a lower molding block having a U-shaped channel which faces the L-shaped baffle. An expandable hose is located in the U-shaped channel. To form a seal, compressed air is introduced into the hose, causing it to expand and engage the L-shaped baffle.

This mold sealing system suffers from drawbacks however. In particular, the inflatable hose is only maintained in the U-shaped channel when pressed against the L-shaped baffle. The inflatable hose requires a source of air under pressure to inflate the hose and engage the seal. Also, the inflatable hose may become dislodged from the U-shaped channel when the L-shaped baffle is lifted from the lower molding block.

U.S. Pat. No. 4,732,553 discloses a seal assembly for molding gaskets around the periphery of a window. It also includes fluid filled bladders which are located in both the upper and lower portions of the molding apparatus. Silicone seals rest above the bladders within seal grooves. The inflatable air bladders within the mold seal groove adjust the non-compressible seal to engage the molding cavity. These seals, however, are maintained in the groove by adhesives and therefore are not easily released from the seal groove.

U.S. Pat. No. 4,688,752 and 4,854,599 also disclose sealing systems with seals in both the upper and lower cooperating mold sections. These patents describe seals which are retained within a mold seal groove by a clamp. In addition, these patents disclose the use of non-elastomeric fluorocarbon materials such as Teflon making up part of the seal. These non-elastomeric components therefore are unable to accommodate for the inherent distortion present in sanitary fixture shells as discussed above.

In response to the above problems associated with the prior art sealing systems proposed above, an alternative sealing system has been proposed by Applicants. In this proposed sealing system, a seal groove is formed in the male mold portion above the upper flange of the shell and adjacent the cavity form between the non-finished surface of the shell and the female mold, when the molding apparatus is in its closed position. In the seal groove, segments of urethane material are inserted end-to-end to form a seal which is retained in the male mold portion by an overhanging edge projection formed by the protective urethane surface coating on the male mold portion. While such a proposed sealing system provides a seal which can be replaced, it is not done without difficulty. In addition, it suffers from additional shortcomings and drawbacks as well. In particular, the overhanging edge projection of the protective urethane surface coating on the male mold portion, fails to adequately retain the seal in the groove of the male mold portion during demolding operations, and as with other proposed sealing systems described above, it is incapable of establishing an effective seal along all engaging surfaces of the shell and seal due to the inherent variations of the shell due to bowing, warping and distortion of the shell due to manufacturing processes.

In view, therefore, of the shortcomings and drawbacks of the proposed prior art methods, and apparatus for effecting a seal between the shell and molding surface of a mold receptor used to mold products therein, there is a clear need to provide a sealing system that overcomes the above described shortcomings and drawbacks.

Accordingly, it is a primary object of the present invention to provide a seal for a molding receptacle for applying a coating to the underside surface of a sanitary fixture shell, wherein the seal is capable of being releasably retained within a groove contained in either the mold receptor or male molding means.

It is another object of the present invention to provide a seal having at least a first and second layer of elastomeric material which is releasably retained within a seal groove and is capable of accommodating for the shell variations which are inherent to the shell due to the manufacturing process.

It is a further object of the present invention to provide a molding apparatus having an improved seal and retaining means.

It is a further object of the present invention to provide a molding apparatus with a sealing system capable of accommodating variations in sanitary fixture shells due to the manufacturing process of the shells.

SUMMARY OF THE INVENTION

These and other objects are achieved by the present invention which provides an elastomeric mold seal and molding apparatus having the inventive elastomeric mold seal, both of which are useful in molding sanitary fixtures such as bathtubs and whirlpool tubs. The seal of the present invention is releasably retained in a mold seal groove. The seal has a first lateral cross section completely contained within the seal groove. The first lateral cross-sectional dimension is larger than the lateral cross section of the opening of the seal groove, thus providing enhanced retention properties for the seal. The seal of the present invention also has a second lateral cross-sectional dimension which is smaller than the lateral cross-sectional dimension of the opening of the mold seal groove and extends beyond the mold seal groove opening to engage a molding surface.

The seal of the present invention is preferably composed of an elastomeric material such as polyurethane having between 20 to about 80 Shore A durometer value. Alternatively, the seal of the present invention may be composed of at least two materials of varying durometer values. In a preferred embodiment, the durometer value of the first layer of elastomeric material which completely resides within the mold seal groove is less than that of the second layer which extends beyond the opening of the mold seal groove. The ealstomeric properties of the seal allow the seal to expand and seal the opening of the seal groove when the seal is engaged under pressure to a second molding surface.

The improved retention qualities of the inventive mold seal is achieved in one embodiment by seals having a trapezoidal lateral cross section. Alternatively, the retaining feature of the seals is achieved by said seal having a seal flange for engaging a recess positioned on the interior of the seal groove beyond the opening of the seal groove. The flange may be further described as having a first rectangular lateral cross section which is joined to a second rectangular cross section which extends beyond the opening of the seal groove.

Also disclosed is a molding apparatus capable of being selectively opened and closed for molding and demolding operations having a molding receptacle capable of receiving a sanitary fixture shell and defining a void between the shell and the molding surface of the molding receptacle. A molding apparatus further includes a male molding member which has a surface which substantially conforms to the surface contour of the shell to apply sufficient pressure to the shell during molding process. The molding apparatus is also configured to contain a mold seal which may reside in either the male molding member or on the top surface of the molding receptacle. The seal assists in forming a closed cavity around the periphery of the shell and the molding surface of the molding receptacle. The seals are composed of elastomeric materials which provide superior accommodation of the variations in the shape of the shells which result from the manufacturing of the shells.

In a preferred embodiment, the seals have at least two layers of elastomeric material having differing durometer values. Also included is a seal having a trapezoidal shape such that the first lateral cross-sectional dimension is larger than the opening of the mold seal groove to assist in retaining the seal within the groove and at least a second lateral cross-sectional dimension which is smaller than the lateral cross-sectional dimension of the seal groove so as to allow the second lateral cross-sectional dimension to extend beyond the opening of a seal groove so that the seal may engage in molding surface.

For a better understanding of the present invention, reference is made to the following description, taken in conjunction with the following figures, the scope of which is pointed out in the appended claims.

BRIEF DESCRIPTION OF THE DRAWINGS

FIG. 5 is a side view of a molding receptacle shown in FIG. 4A without the sealing system of the present invention, showing the existence of a distortion contour along the length of the seal, between the upper flange ends of the sanitary fixture shell and the seal, due to variations in shell contour which result during manufacturing operations;

FIG. 6A is a perspective view of a molding receptacle showing the elastomeric seal of the present invention in the seal groove, with a portion of the seal broken away for purpose of illustration;

FIG. 8A is a cross-sectional view showing a sanitary fixture shell embraced within the molding apparatus in its open position, and where an elastomeric seal of the present invention is installed within a seal groove on the molding receptacle.

FIG. 8B is a cross-sectional view showing a sanitary fixture shell embraced within the molding apparatus in its closed position, with an elastomeric seal of the present invention installed within a seal groove on the molding receptacle.

FIG. 9A is a cross-sectional view showing a sanitary fixture shell embraced within the molding apparatus in its open position, and where an elastomeric seal of the present invention is installed within a seal groove on the male molding member;

FIG. 9B is a cross-sectional view showing a sanitary fixture shell embraced within the molding apparatus in its closed position, with an elastomeric seal of the present invention installed within a seal groove on the male molding member;

FIG. 10 is a cross-sectional view of an elastomeric seal made in accordance with the present invention installed within a seal groove on the male molding member.

FIG. 11 is a cross-sectional view of an elastomeric seal made in accordance with the present invention showing the seal having a first and second elastomeric layer.

DETAILED DESCRIPTION OF THE PREFERRED EMBODIMENT

Referring to FIGS. 4A through 11 in particular, the preferred embodiment of a molding system constructed in accordance with the principles of the present invention will now be described in detail as follows.

In general, the method and apparatus of the present invention is applicable between a wide variety of apparatus used in applying a reinforced plastic coatings to the underside surface of a shell, such as those used in forming sanitary fixtures, including bathtubs, sinks, whirlpool bathtubs, spas, therapeutic tubs and the like, however, for purposes of illustration only, the general concepts and principles of the present invention are herein illustrated in apparatus for applying a reinforced polymeric coating to a bathtub. As used hereinafter, and in the claims, the term "sanitary fixtures" shall be understood to include all of the above-mentioned sanitary fixtures, and other types of liquid containing vessels, in which water is contained.

Figure 4A:
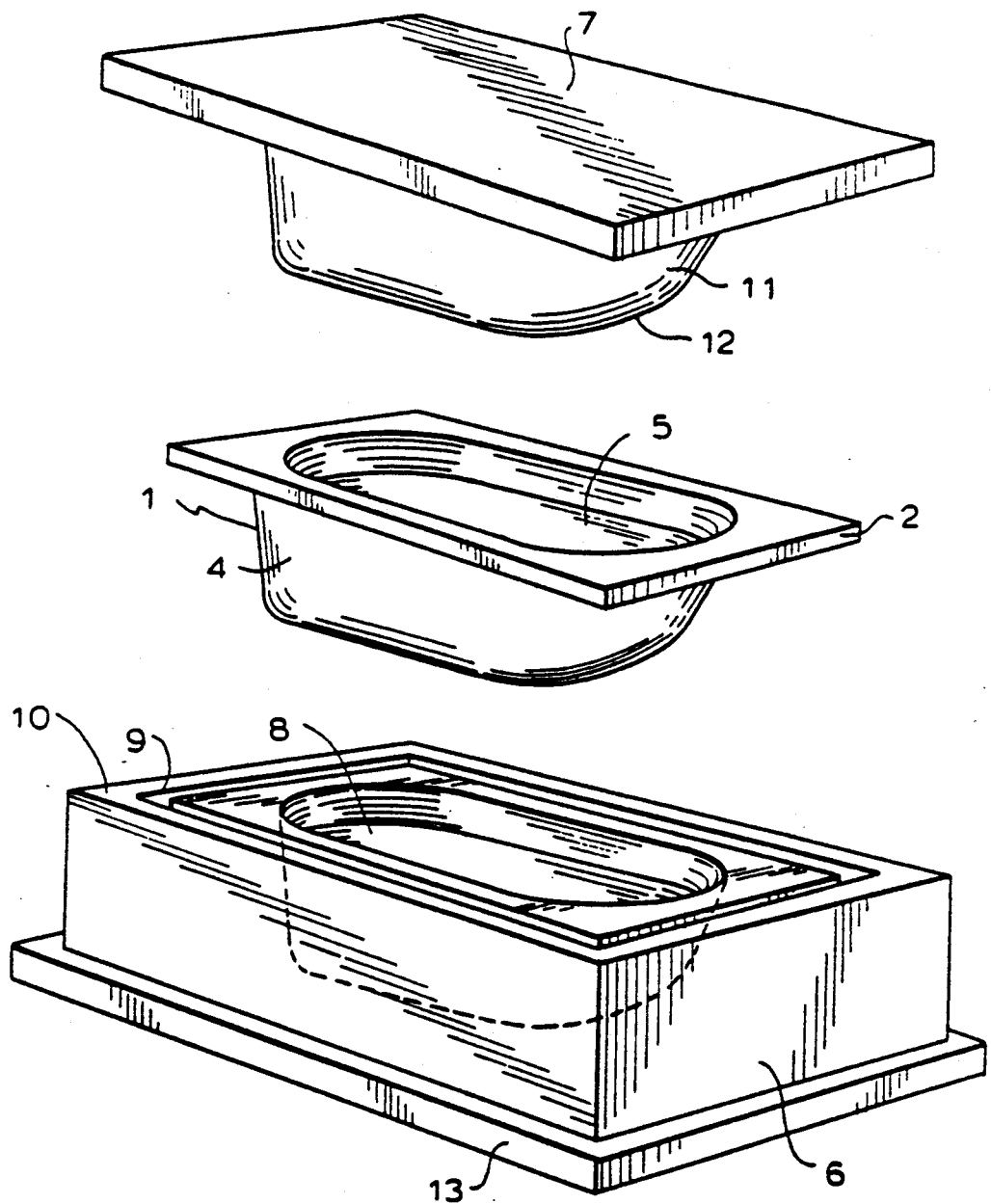
FIG. 4A is a perspective schematic diagram of a molding receptacle used in RIM and/or RRIM processes show in a mold having a molding surface and a male molding member having a protective surface coating, with a sanitary fixture shell interposed therebetween.

In FIG. 4A, there is shown molding apparatus used in applying a reinforced polymeric coating against the side surface of a shell 1, as described, for example, in co-pending U.S. patent application Ser. No. 07/458,598 filed on Dec. 29, 1989, incorporated reference herein. In general, the molding apparatus comprises a molding receptacle unit 6 placed on a stationary platform 13 and a male molding member 7. The molding receptacle includes a molding surface 8 generally corresponding to the surface geometry of the underside surfaces of the shell 1 to which the polymeric coating is to be applied. About the substantially planar deck portion 10 of the molding receptacle, there is formed a seal groove 9 in the planar deck portion 10 of the molding receptacle unit 6.

As illustrated in FIG. 4A, the seal groove 9 extends about the perimeter of the molding receptacle surface 8 and extending continuously so as to enclose form a groove in the shape of a substantially rectangular loop.

Figure 4B:
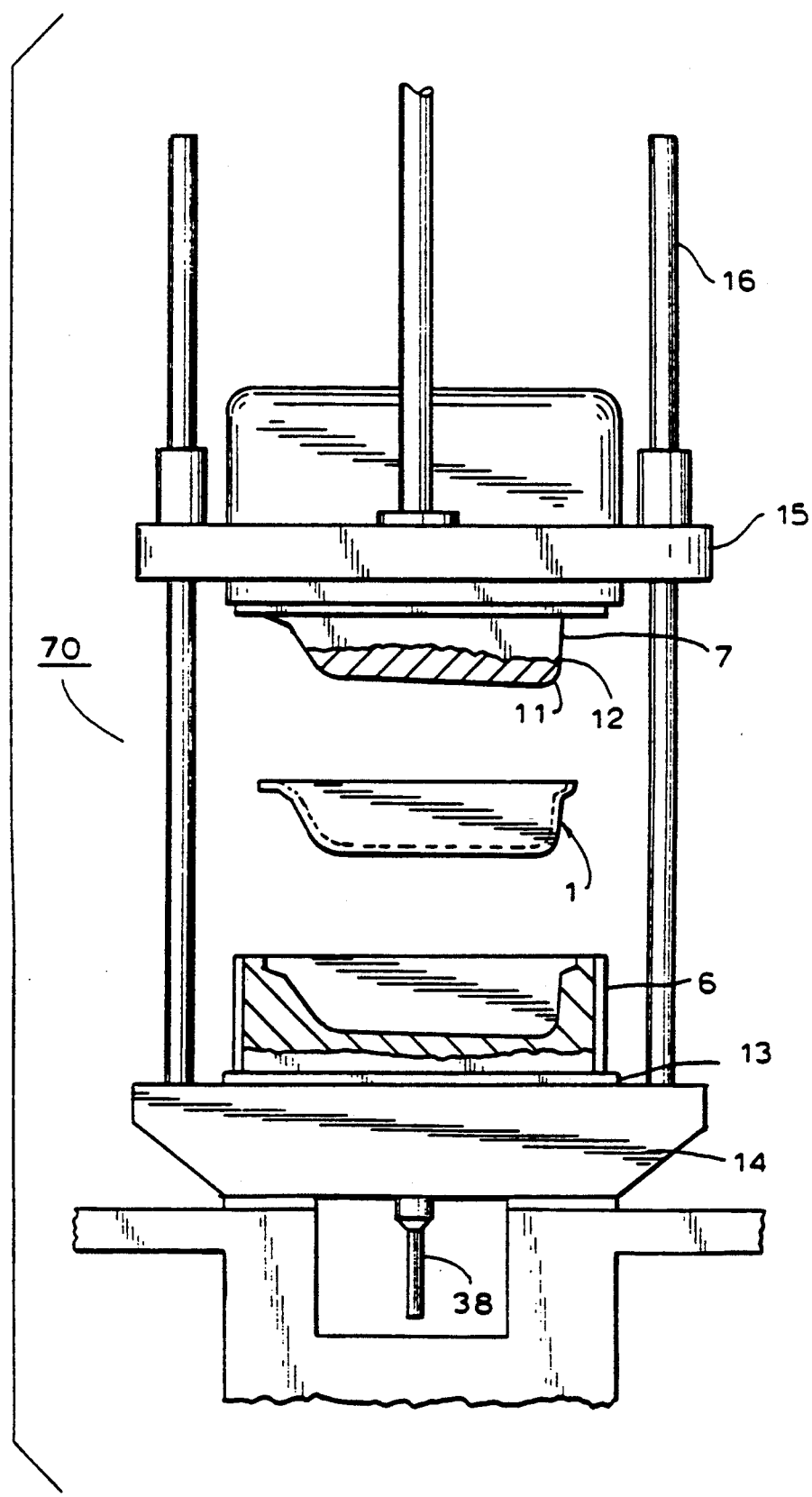
FIG. 4B is an elevated side view of a molding apparatus illustrated in FIG. 4A, shown with a mold press used for closing the male molding member down onto the molding receptacle with the sanitary fixture interposed therebetween under molding pressures.

While not shown in FIG. 4A, the molding receptacle is provided with at least one aperture formed in the molding surface which communicates with a mix head 38 as shown FIG. 4B for introducing a hardenable polymeric foam material into the molding cavity (i.e. void) created between the molding surface 8 and the non-finish surface 4 of the shell. Also, a plurality of ejectors positioned in the molding receptacle unit 6, and serve to separate and eject a molded bathtub from the molding receptacle after the RIM or RRIM molding process has been completed. Preferably, the ejectors are cylindrical rods which are hydraulically activated from a recessed position to an ejector position and visa versa.

The male molding member 7 in general comprises a support surface 11 having a surface geometry of the bathtub shell 1. This support surface bears a protective coating 12 formed from materials such as urethane attached to the pressure applying surface 11 to provide a soft resilient surface which provides support to the shell during molding operations, without damaging the finish surface 5 thereof.

Referring to FIG. 4B, there is shown a molding receptacle 6, and a male molding member 7 attached to a stationary platform 13 and a translatable platform 14, respectively of a mold press 15. The mold press also includes a hydraulically operated system 16 which lowers and retains the male molding member 7 against the bathtub shell 1 on the finish surface 5 thereof and the non-finish surface 4 of the shell adjacent with the molding surface 8 of the molding receptacle 6 during the molding process. In such a lowered position, a molding cavity 18 is formed between the non-finish surface 4 of the shell and the molding surface 8 of the molding receptacle 6, as particularly illustrated, for example in FIG. 6C. A mold press 15 which is suitable for molding bathtubs in accordance with the method and apparatus of the present invention is manufactured by Linden Industries, Inc.

Figure 6B:
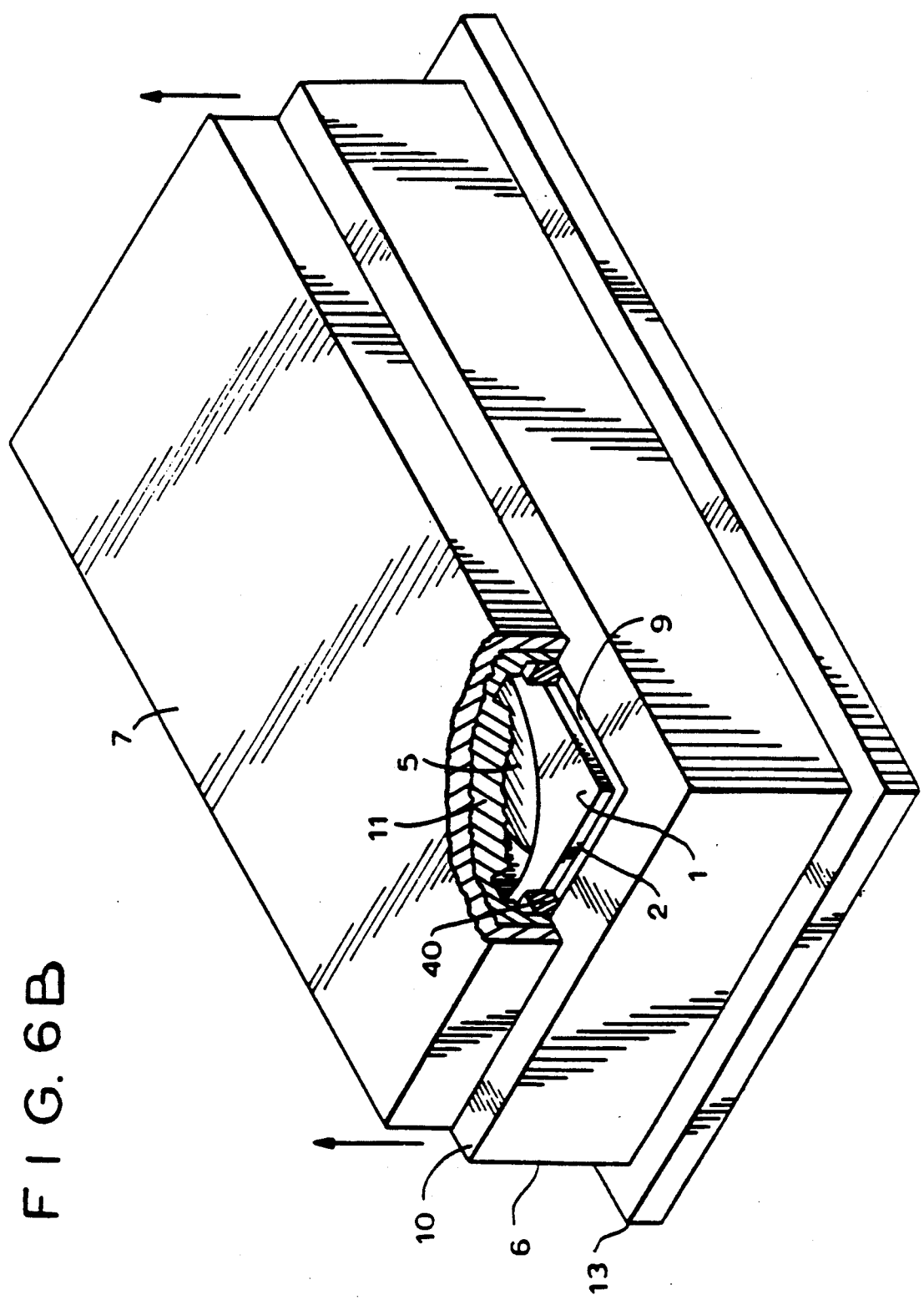
FIG. 6B is a perspective view of a molding receptacle and a male molding member, with a sanitary fixture shell interposed therebetween, with the elastomeric seal system of the present invention in place and with the molding apparatus approaching its closed position, and where a portion of the male molding member, the elastomeric seal of the present invention, and shell are shown broken away.
Figure 6C:
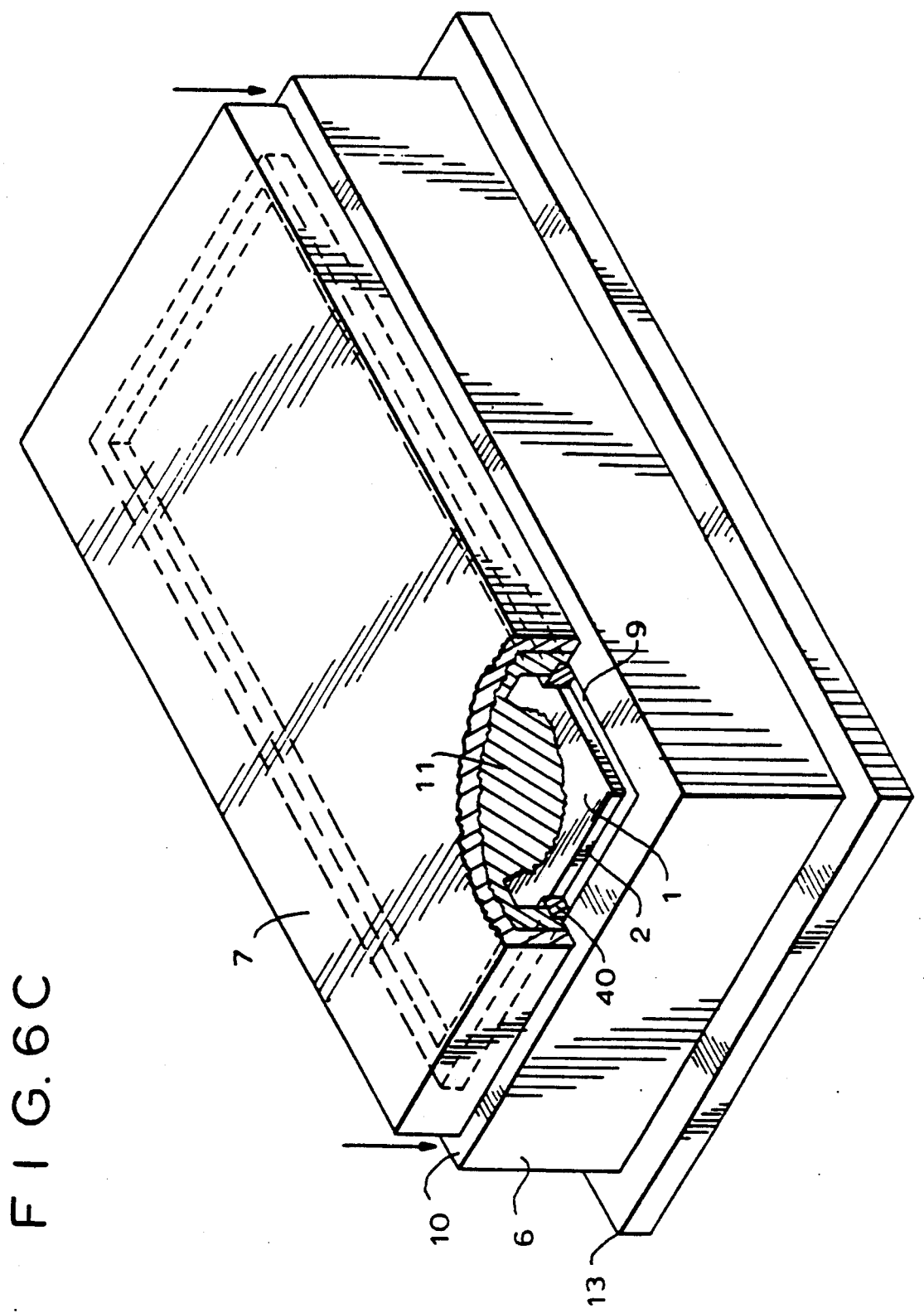
FIG. 6C is a perspective view of a molding receptacle and a male molding member, with sanitary fixture shell embraced therebetween, with the elastomeric seal system of the present invention in place and with the molding apparatus in its closed position, and where a portion of the male molding member, sealing system of the present invention, and shell are shown broken away.

Referring now to FIG. 6A, the molding receptacle unit 6 is shown with an elastomeric seal 40 installed within a seal groove 9 which is continuous about the deck portion 10 of the mold receptacle. A portion of the seal 40 shown broken away to illustrate the structure of the seal.

The elastomeric seal is preferably constructed from urethane-based materials in a manner well known to those skilled in the art. The urethane, for example, may be obtained from Uniroyal as VIBRATHANE® 6020 or VIBRATHANE® 8011. In addition thereto, the urethane is combined with a plasticizer such as BENSOFLEX® 9-88 S.G. available from Velsicol Chemical and curatives suchas 1,4-butanediol available from Kodak or ISONOL 93® from Dow Chemical. The urethane based seals are prepared upon specific need so that the amounts of the above ingredients may be varied, as well known to those skilled in the art, to adjust the durometer value of the resultant seal.

The elastomeric seal is further defined as having a Shore A durometer hardness value of from about 20 to about 80, preferably from about 35 to about 45, and most preferably 39 to 41.

In a preferred embodiment, the seal is composed of at least two layers of differing durometer elastomeric materials, which is illustrated in FIGS. 8A, 8B, 9A, 9B and 11. The first layer of elastomeric material has a cross-sectional dimension which is completely retained within the seal groove 9. The lateral cross-sectional dimension of this first layer cooperates with the seal groove 9 as defined by the opposing side walls 21, bottom wall 20 and opening 22. The cross-sectional dimension of the first layer of elastomeric material is further defined as being larger than the lateral cross-sectional dimension of the opening 22 of the seal groove 9, thus providing a seal retention feature for retaining the seal within the groove. This structure greatly reduces the heretofore frequently unavoidable and time consuming process of re-inserting the seal during operational runs due to the tendency of the seals to become dislodged from the seal groove upon demolding.

The first layer of elastomeric material preferably has a durometer value of from about 35 to about 45 and more preferably from about 39 to about 41. It has been found that elastomeric materials having the above-mentioned durometer values provide superior ability to be retained within the seal groove during demolding operations, while at the same time providing the molding apparatus operator with sufficient flexibility to retrieve the seal from the seal groove when necessary.

In this preferred embodiment, there is provided at least a second layer of elastomeric material joined to the first layer. The second layer of elastomeric material has a lateral cross-sectional dimension which is smaller than the lateral cross-sectional dimension of the opening 22 of the seal groove 9 and extends slightly beyond the opening of the mold seal groove to engage a molding surface, for example the non-finish side of a sanitary fixture shell. Preferably, the second layer of elastomeric material differs in hardness value than the first layer.

The durometer value of the second layer of elastomeric material in this embodiment is from about 35 to about 80 Shore A durometer and more preferably from about 60 to about 80. Alternatively, the seal may be composed of at least two layers of elastomeric material wherein the durometer value of the second layer of elastomeric material is about twice that of the first layer.

Since the seal is composed of elastomeric materials, when engaged in the molding apparatus, the seal expands within the opening of the seal groove to form a better seal during molding operations. The shape of the seal assists in retaining the seal in the seal groove during demolding operations when the male molding member 7 is pulled away from the molding receptacle 6. This seal retention feature of the present invention is most important since the upper flange edge 2 of the shell and the cured, foamed reinforced polymeric material 25 typically adhere to the top surface 43 of the seal 40 during demolding operations, causing forces on the seal which attempt to pull the seal out and away from the seal groove 9. If the seal 40 is removed from the seal groove 9 during demolding operation, this disengagement of the seal requires the manual reinsertion of the seal in the groove. This reinsertion step therefore can be time consuming, laborious, and costly from the manufacturer's point of view. Thus, the seal retention feature of the present invention, which is realized by having a first layer of elastomeric material having a first cross-sectional dimension which is larger than the opening of the seal groove and a second layer of elastomeric material joined to said first layer having extending beyond the opening of the seal groove allows for a molding apparatus to have approved molding operations.

Referring now to FIG. 5, there is shown a typical bathtub shell 1 which is positioned under a male molding member 7 which is not closed down upon the molding receptacle 6. The elastomeric seal 40 is retained within the seal groove 9. As shown, the height of the seal extends beyond the seal groove opening 22 and is substantially parallel with the deck portion 10 of the molding receptacle 6. In a seal used in molding sanitary fixtures, for example, the seal groove is about 500 thousandths of an inch deep and the seal is such that it extends about 60 thousandths of an inch beyond the seal groove opening 22, having a height dimension of 560 thousandths of an inch. The elastomeric seal may also rest upon a shim 50 which is placed in the seal groove, but where a shim is used, the seal groove is deepened so that the seal, which, in this illustrative embodiment maintains only a slight, about 60 thousandths of an inch, extension beyond the seal groove opening 22.

When the multi-layered elastomeric seal embodiment is used, the first layer of elastomeric material comprises about 65% of the seal's height dimension and the second layer comprises the remaining 35%.

Figure 1:
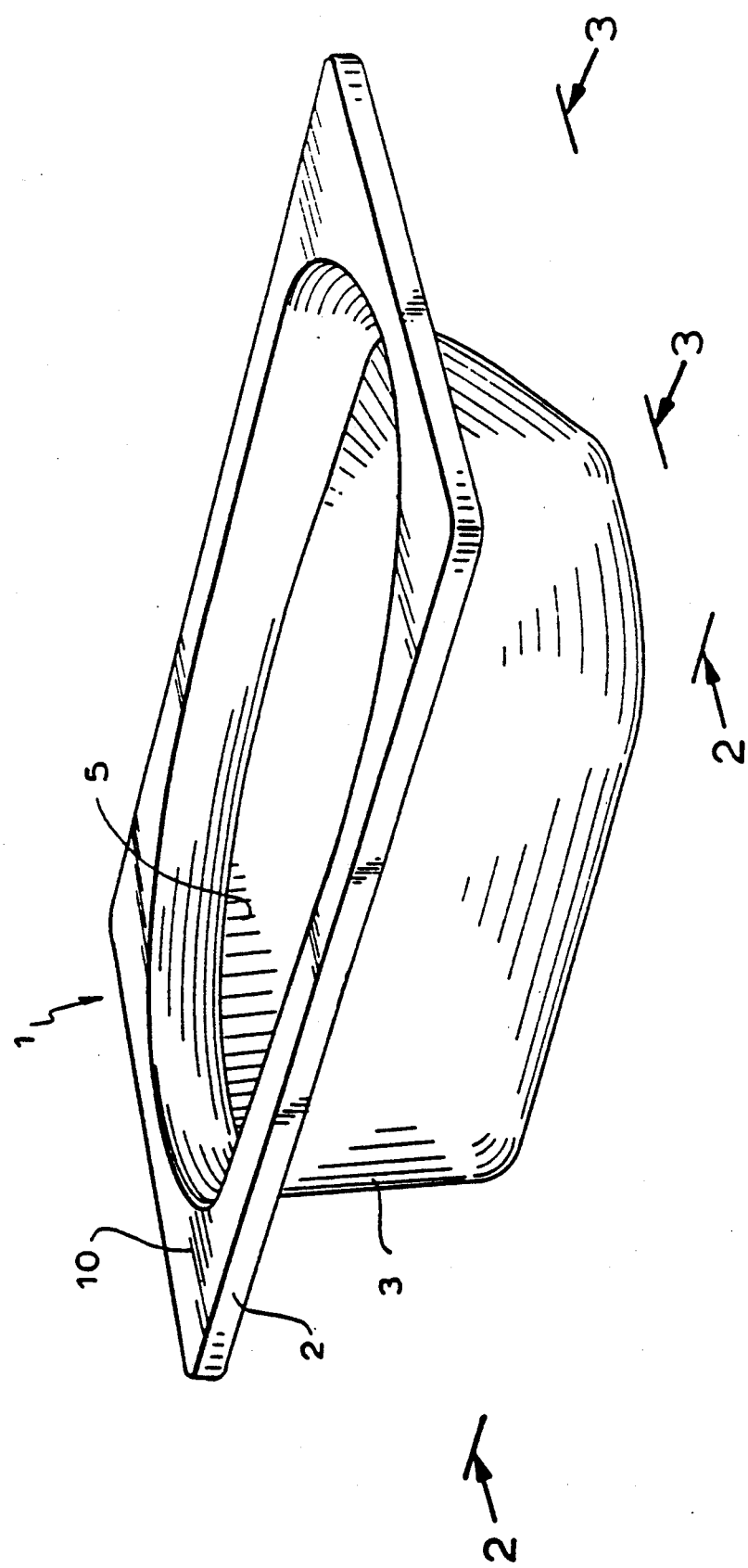
FIG. 1 is a perspective view of a sanitary fixture shell to which a reinforced foam plastic coating is applied during a RIM or a RRIM process.
Figure 2:
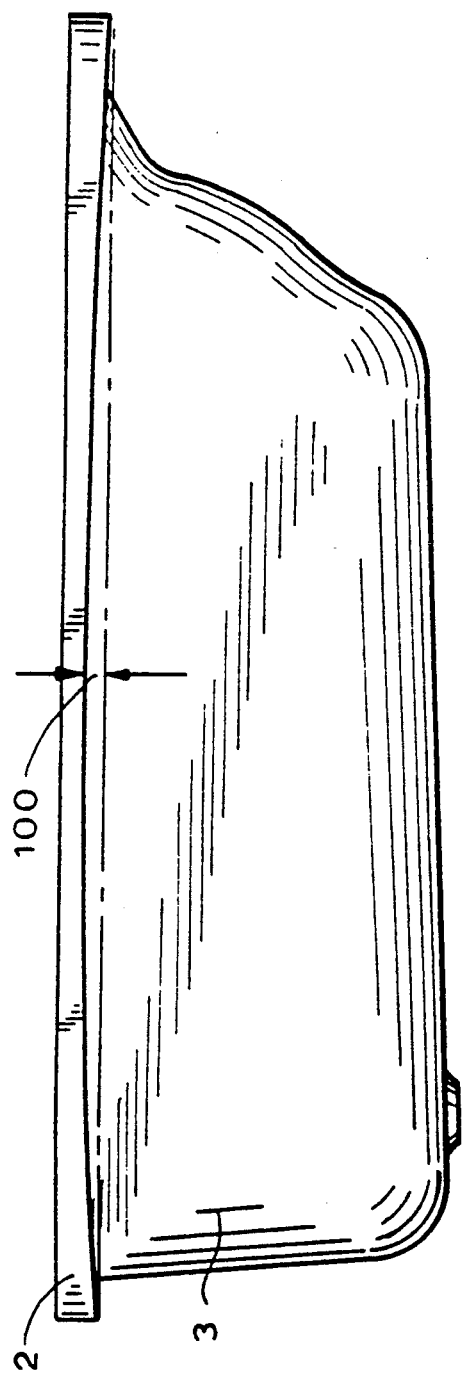
FIG. 2 is a side view of the sanitary fixture shell taken along line 2—2 of FIG. 1, illustrating inherent variations (i.e. presence of a distortion contour) in the horizontal direction along the upper flange of the shell, caused during manufacturing operations.
Figure 3:
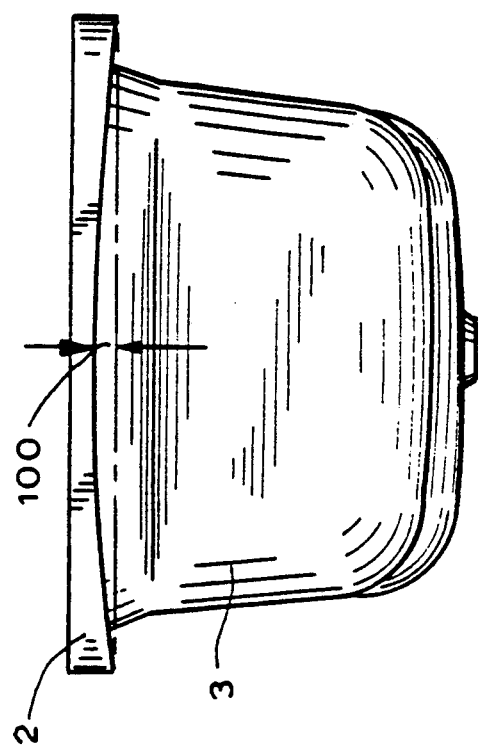
FIG. 3 is a side view of the sanitary fixture shell taken along line 3 of FIG. 1, illustrating inherent variations in horizontal direction along the upper edge of the shell due to manufacturing operations.

FIGS. 2 and 3 show a distortion contour 100 formed between the upper flange edge 2 and the top surface of the seal 43 when the molding apparatus is in the opened position. Typically, the gaps which occur due to the manufacturing process of the sanitary fixture shell range from about 0 (or flat) to about 0.094 inches. The elastomeric seals of the present invention accommodate for the inherent variations of the shell from flat up to about 3/32 of an inch. In addition, further accommodation of the inherent variations of the shell greater than the 3/32 of an inch amount can be achieved by adding a shim apparatus as disclosed in copending application entitled, "ADJUSTABLE SHIMS FOR MOLD SEALS" filed by the present inventors concurrently herewith.

Figure 7:
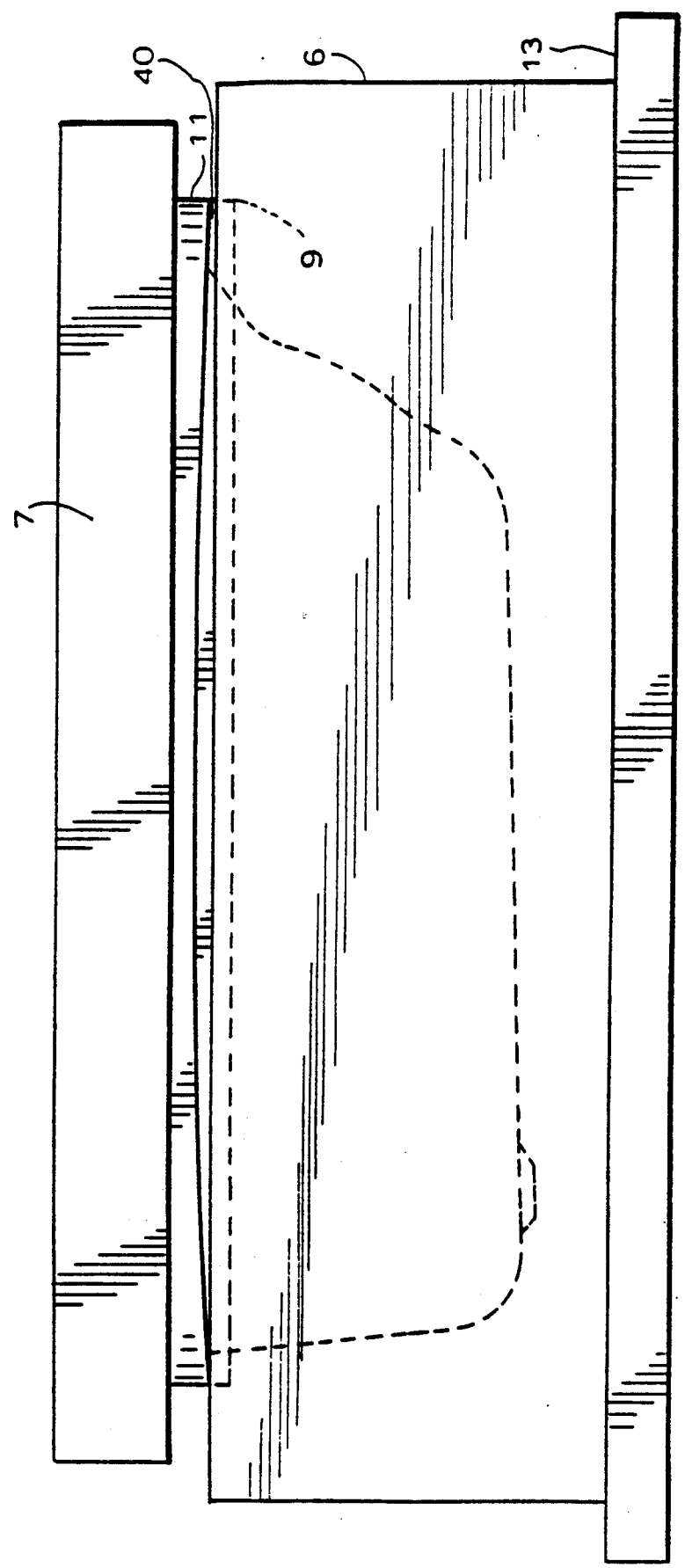
FIG. 7 is an elevated cross-sectional view of the molding apparatus and sealing system of the present invention shown in FIG. 6C, taken along line 7—7, illustrating the elastomeric seal within a seal groove and its capability of adapting to variations in the shell due to manufacturing processes to provide a perfect seal during molding operations.

FIG. 7 shows the molding apparatus as depicted in FIG. 5 in the closed position. The elastomeric seal of the present invention is seen accommodating for the inherent distortion of the sanitary fixture shell.

Referring now to FIGS. 8A and 8B, a more detailed view of one embodiment of an elastomeric seal prepared in accordance with the present invention as shown. In this embodiment, the seal groove 9 comprises a bottom wall 20 opposing side walls 21 and an opening 22 for accepting the seal 40. The molding cavity 18 is completely sealed between the non-finish surface 4 of the shell 1 and the molding surface 8.

Referring now to FIGS. 8A and 8B in particular, there is shown a seal 40 made in accordance with one embodiment of the present invention placed within a seal groove and contacting a shim 50 placed on the bottom wall 20 of the seal groove. The seal has a first layer of elastomeric material 42 completely retained within said seal groove and accounts for about 65% of the seal's height dimension. The first layer of elastomeric material has side walls 41 contacting a portion of the side walls 21 of the mold seal groove. The lower portion 43 of the side wall of the first layer extends beyond the cross-sectional dimension of the opening 22 of the mold seal groove 9 to facilitate retention of the seal 40 within the seal groove.

The second layer of elastomeric material 44 is shown joined to the first layer of elastomeric material 42. This second layer extends beyond the opening 22 of the mold seal groove 9 and comprises the remaining 35% of the seal's height dimension. This second layer has side walls 45 parallel to and in contact with the side walls 21 of the mold seal groove. A top surface 49 is also provided on the second layer of elastomeric material to engage the upper flange edge 2 of the shell 1 when the shell is placed within the molding receptacle 6.

Referring now to FIGS. 9A-11, there is shown another embodiment of the seal of the present invention. As was described above, the seal as configured in FIGS. 9A and 9B in the molding apparatus 70 will accommodate a slight distortion contour inherent along any particular upper flange edge 2, even without a shim when the male molding member 7 is configured with a seal groove 9 having a trapezoidal seal 80 contained therein. The trapezoidal seal has a top surface 82 extending beyond the opening of 22 of the mold seal groove 9 by virtue of having a cross-sectional dimension smaller than that of said opening of said seal groove. The seal also includes a bottom surface 84 resting against the bottom wall 20 seal groove 9. This bottom surface has a cross-sectional dimension larger than the cross-sectional dimension of the opening 22 of the mold seal groove 9. Side walls 86 join the top and bottom surfaces in a manner which completes the trapezoidal shape. Side walls contact the side walls 21 of the mold seal groove.

The angled shape of the seal in this embodiment, as facilitated by angular side walls 86, exhibits vastly superior sealing qualities due to expansion of the seal in the seal groove. It also results in superior retention qualities for maintaining the seal in the seal groove, especially during the demolding phase of the molding operation.

In this embodiment, the seal may be either of a single elastomeric layer, such as polyurethane or may be composed of at least two layers of polyurethane having varying hardnesses. For example, in molding elastomeric materials, such as sanitary fixtures, such as bathtubs, the seal has a height dimension of 560 thousandths of an inch with about 60 thousandths of an inch typically extending beyond the opening 22 of the seal groove 9. As stated above, the seal 40 is configured to contain a first cross-sectional dimension 81 which cooperates with a bottom surface of a seal groove 20 which is larger than a lateral cross-sectional dimension of an opening of the seal groove 9.

The elastomeric materials which make up the seal of this embodiment are selected from commercially available polyurethane type materials such as REN ® by Ciba-Geigy item No. 6400 having a durometer reading of 50 as measured on the Shore A method. The range of acceptable durometer values, however, range from about 20 to about 80. However, a preferred range is between about 35 to about 45 durometer as measured by the Shore A scale with a most preferred being 40 durometer. It is also to be understood that the durometer readings of the elastomeric seals made in accordance with the present invention may vary plus or minus 3.

Referring now to FIG. 11, there is shown a seal in accordance with the present invention having a trapezoidal shape made of at least two layers of elastomeric material. In this alternative embodiment, the durometer value of the first layer elastomeric material 42 is from about 35 to 40 with a preferred durometer value of 40. The first layer comprises about 65% of the total seal height dimension and resides completely within the seal groove 9. At least a second layer of elastomeric material is joined to the first layer. The second layer comprises the remaining 35% of the seal and preferably has a durometer value of between 45 and 80 with a preferred value of about 55, Shore A. When the above described seals are used in molding apparatus for molding sanitary fixtures such as bathtubs, the seal groove 9 is about 500 thousandths of an inch deep and the elastomeric seal 40 retained therein is about 560 thousandths of an inch, allowing 60 thousandths to extend beyond the mold seal groove opening 22. When the molding apparatus 70 is employed using the elastomeric seals of the present invention, the molding cavity 18 formed when the shell 1 placed between cooperating mold receptacle 6 and made molding member 7 is complete between the non-finish surface 4 of the shell and the molding surface 8 of the molding receptacle. In addition, it has been found that the seals of the present invention and molding apparatus configured to contain such seals demonstrate superior ability to accommodate inherent variations in shells used in the molding of sanitary fixtures while at the same time demonstrating improved ability to be retained within seal grooves which can be located in either the male molding member, molding receptacle or seal.

Thus, while there have been described what are presently contemplated preferred embodiments of the present invention, further changes and modifications could be made by those skilled in the art without departing from the scope of invention, and it is contemplated to claim all such changes and modifications.

What is claimed is:

1. A seal for molding articles, comprising:
   (a) a first layer of elastomeric material having a first hardness value and a first lateral cross-sectional dimension for cooperation with an inside surface of a seal groove in a first molding surface, said first lateral cross-sectional dimension of said seal being larger than a lateral cross-sectional dimension of an opening of the seal groove, and
   (b) a second layer of elastomeric material joined to said first layer for engagement to a second molding surface, said second layer having a different hardness value than said first layer, and said second layer having a lateral cross-sectional dimension extending beyond said seal groove, said second lateral cross-sectional dimension of said seal being smaller than said lateral cross-sectional dimension at the opening of said seal groove,
   whereby said elastomeric seal is releasably retained in said seal groove by a portion of said seal having said first lateral cross-sectional dimension and the portion of said seal extending beyond said seal groove engages a second molding surface for molding an article, the hardness value of the first layer being in the range of from about 35 to about 45 Shore A durometer and the hardness value of said second layer being from about 45 to about 80 Shore A 2. The seal of claim 1, wherein said second layer has a hardness value greater than said first layer. durometer.

3. A seal for molding articles, comprising:
   (a) a first layer of elastomeric material having a first hardness value and a first lateral cross-sectional dimension for cooperation with an inside surface of a seal groove in a first molding surface, said first lateral cross-sectional dimension of said seal being larger than a lateral cross-sectional dimension of an opening of the seal groove, and
   (b) a second layer of elastomeric material joined to said first layer for engagement to a second molding surface, said second layer having a different hardness value than said first layer, and said second layer having a lateral cross-sectional dimension extending beyond said seal groove, said second lateral cross-sectional dimension of said seal being smaller than said lateral cross-sectional dimension at the opening of said seal groove, whereby said elastomeric seal is releasably retained in said seal groove by a portion of said seal having said first lateral cross-sectional dimension and the portion of said seal extending beyond said seal groove engages a second molding surface for molding an articles, said second layer having a hardness value at least twice as hard as said first layer.

4. A seal for molding articles, comprising:
   (a) a first layer of elastomeric material having a first hardness value and a first lateral cross-sectional dimension for cooperation with an inside surface of a seal groove in a first molding surface, said first lateral cross-sectional dimension of said seal being larger than a lateral cross-sectional dimension of an opening of the seal groove, and
   (b) a second layer of elastomeric material joined to said first layer for engagement to a second molding surface, said second layer having a different hardness value than said first layer, and said second layer having a lateral cross-sectional dimension extending beyond said seal groove, said second lateral cross-sectional dimension of said seal being smaller than said lateral cross-sectional dimension at the opening of said seal groove,
   whereby said elastomeric seal is releasably retained in said seal groove by a portion of said seal having said first lateral cross-sectional dimension and the portion of said seal extending beyond said seal groove engages a second molding surface for molding an article, the hardness value of said first layer being from about 39 to about 41 Shore A durometer and wherein the hardness value of said second layer is from about 52 to about 55 Shore A durometer.

5. A seal for molding articles, comprising:
   (a) a first layer of elastomeric material having a first hardness value and a first lateral cross-sectional dimension for cooperation with an inside surface of a seal groove in a first molding surface, said first lateral cross-sectional dimension of said seal being larger than a lateral cross-sectional dimension of an opening of the seal groove, and
   (b) a second layer of elastomeric material joined to said first layer for engagement to a second molding surface, said second layer having a different hardness value than said first layer, and said second layer having a lateral cross-sectional dimension extending beyond said seal groove, said second lateral cross-sectional dimension of said seal being smaller than said lateral cross-sectional dimension at the opening of said seal groove, whereby said elastomeric seal is releasably retained in said seal groove by a portion of said seal having said first lateral cross-sectional dimension and the portion of said seal extending beyond said seal groove engages a second molding surface for molding an article, said seal having a trapezoidal lateral cross-section.

6. The seal according to claim 5, wherein said seal expands to seal the opening of said seal groove when said seal in engaged under pressure to said second molding surface.

7. A seal for molding articles, comprising:
(a) a first layer of elastomeric material having a first hardness value and a first lateral cross-sectional dimension for cooperation with an inside surface of a seal groove in a first molding surface, said first lateral cross-sectional dimension of said seal being larger than a lateral cross-sectional dimension of an opening of the seal groove, and
(b) a second layer of elastomeric material joined to said first layer for engagement to a second molding surface, said second layer having a different hardness value than said first layer, and said second layer having a lateral cross-sectional dimension extending beyond said seal groove, said second lateral cross-sectional dimension of said seal being smaller than said lateral cross-sectional dimension at the opening of said seal groove, whereby said elastomeric seal is releasably retained in said seal groove by a portion of said seal having said first lateral cross-sectional dimension and the portion of said seal extending beyond said seal groove engages a second molding surface for molding an article, said first lateral cross-sectional dimension including a seal flange for releasably retaining said seal in said seal groove.

8. The seal of claim 7, wherein said flange is a two-sided flange for engaging a recess within said seal groove, said recess is positioned on the interior of said seal groove beyond said opening.

9. The seal of claim 8, wherein said flange includes a first rectangular lateral cross section which is joined to said second layer of elastomeric material having a second rectangular cross section.

10. A seal for molding articles, comprising:
(a) a first lateral cross-sectional dimension of elastomeric material for cooperation with an inside surface of a seal groove in a first molding surface, said first lateral cross section of said seal is larger than a lateral cross-sectional dimension of an opening of the seal groove;
(b) said seal having a second lateral cross-sectional dimension of elastomeric material at a portion of said seal which extends beyond said seal groove said second lateral cross section of said seal is smaller than said lateral cross-sectional dimension at the opening of said seal groove; and
(c) said portion of said seal which extends beyond said seal groove having a surface which engages a shell for molding a sanitary fixture, said second lateral cross-sectional dimension of said seal having a greater hardness value than the hardness value of said first lateral cross-sectional dimension of said seal, whereby said elastomeric seal is releasably retained in said seal groove by a portion of said seal having said first lateral cross-sectional dimension.

11. The seal of claim 10, wherein said seal has a hardness value of from about 20 to about 80 Shore A durometer.

12. The seal of claim 11, wherein said seal has a hardness value of from about 35 to about 45 Shore A durometer.

13. The seal of claim 12, wherein said seal has a hardness value of from about 39 to about 41 Shore A durometer.

14. The seal of claim 10, wherein said first lateral cross-sectional dimension of said seal further comprises a first layer of elastomeric material and said second lateral cross-sectional dimension of said seal further comprises a second layer of elastomeric material.

15. The seal of claim 14, wherein said first layer of elastomeric material and said second layer of elastomeric material have differing hardness values.

16. The seal according to claim 14, wherein the hardness value of the first layer is in the range of from about 35 to about 45 and wherein the hardness of said second layer is from about 60 to about 80 Shore A durometer.

17. The seal of claim 14, wherein said second layer has a hardness value at least twice as hard as said first layer.

18. The seal according to claim 14, wherein the hardness value of said first layer is from about 39 to about 41 and wherein the hardness of said second layer is from about 52 to 55 Shore A durometer.

19. The seal according to claim 14, wherein said seal has a trapezoidal lateral cross section.

20. The seal according to claim 19, wherein said seal expands to seal the opening of said seal groove when said seal in engaged under pressure to said second molding surface.

21. The seal of claim 14, wherein said first lateral cross-sectional dimension includes a seal flange for releasably retaining said seal in said seal groove.

22. The seal of claim 21, wherein said flange is a two-sided flange for engaging a recess within said seal groove, said recess is positioned on the interior of said seal groove beyond said opening.

23. The seal of claim 22, wherein said flange includes a first rectangular lateral cross section which is joined to said second layer of elastomer material having a second rectangular cross section.

* * * * *